US009608983B2

(12) United States Patent
Fee (10) Patent No.: US 9,608,983 B2
(45) Date of Patent: Mar. 28, 2017

(54) AUTHENTICATION SYSTEM AND METHOD FOR EMBEDDED APPLETS

(71) Applicant: Sensormatic Electronics, LLC, Boca Raton, FL (US)

(72) Inventor: Paul Fee, Belfast (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 13/873,747

(22) Filed: Apr. 30, 2013

(65) Prior Publication Data

US 2014/0325627 A1    Oct. 30, 2014

(51) Int. Cl.
G06F 3/00   (2006.01)
H04L 29/06  (2006.01)
H04L 29/08  (2006.01)

(52) U.S. Cl.
CPC ...... H04L 63/0815 (2013.01); H04L 63/0807 (2013.01); H04L 63/168 (2013.01); H04L 67/02 (2013.01)

(58) Field of Classification Search
CPC .. G06F 8/38; G06F 17/2247; G06F 17/30896; G06F 9/5027; H04W 12/06
USPC ..................... 726/4, 7, 8; 713/153
See application file for complete search history.

(56) References Cited

U.S. PATENT DOCUMENTS

| | | | | |
|---|---|---|---|---|
| 6,067,558 A * | 5/2000 | Wendt | ............... | G06F 9/5027 707/E17.118 |
| 6,223,287 B1 * | 4/2001 | Douglas | ............ | H04L 63/0428 380/255 |
| 6,587,867 B1 * | 7/2003 | Miller | ............... | G06Q 20/10 705/38 |
| 6,711,618 B1 * | 3/2004 | Danner | ............... | H04L 29/06 704/E15.044 |
| 8,943,154 B1 * | 1/2015 | Bodell | ............ | H04L 41/0604 709/206 |
| 2001/0020255 A1 * | 9/2001 | Hofmann | ............ | G06F 9/541 719/318 |

(Continued)

OTHER PUBLICATIONS

"Bug ID: JDK-4656979: User must authenticate twice with java plug-in 1.4.0." Oracle, May 13, 2002.

(Continued)

*Primary Examiner* — Joseph P Hirl
*Assistant Examiner* — Sayed Beheshti Shirazi
(74) *Attorney, Agent, or Firm* — HoustonHogle LLP (57) ABSTRACT

A system and method for authenticating user requests issued from embedded applets running on web-accessible user devices. The server system generates authentication tokens associated with user credentials, in response to user requests for HTML pages that include the embedded applets. The server system stores the authentication tokens on the server system, and includes the authentication tokens in URLs within applet tags in the HTML pages returned to the user devices. When the applets download and request content from the server system, the applets supply the previously included authentication tokens in the URLs that identify the requested content. Upon finding a match between the applet-supplied authentication tokens and the stored authentication tokens, the server identifies the user as a trusted user, and responds with the requested content. This can be used to eliminate HTTP-based authentication challenges for subsequent user access.

38 Claims, 4 Drawing Sheets

(56) References Cited

U.S. PATENT DOCUMENTS

| | | | |
|---|---|---|---|
| 2001/0051958 A1* | 12/2001 | deVries | G06F 17/30817 715/233 |
| 2005/0132222 A1* | 6/2005 | Petrovic | H04L 9/3213 726/4 |
| 2007/0211734 A1 | 9/2007 | Yang et al. | |
| 2008/0127323 A1 | 5/2008 | Soin et al. | |
| 2009/0292816 A1* | 11/2009 | Etchegoyen | H04L 63/08 709/229 |
| 2009/0319776 A1 | 12/2009 | Burch et al. | |
| 2010/0080175 A1 | 4/2010 | Kang et al. | |
| 2010/0100445 A1* | 4/2010 | Flood | G06Q 30/02 705/14.64 |
| 2010/0293281 A1* | 11/2010 | Tsimelzon | G06F 11/203 709/228 |
| 2010/0325720 A1* | 12/2010 | Etchegoyen | H04L 63/1408 726/17 |
| 2011/0314290 A1* | 12/2011 | Fort | G06F 21/31 713/176 |
| 2012/0011358 A1* | 1/2012 | Masone | G06F 21/305 713/153 |
| 2012/0185922 A1* | 7/2012 | Kamity | H04N 21/25875 726/4 |
| 2012/0324556 A1* | 12/2012 | Yefimov | H04W 12/06 726/7 |
| 2013/0219178 A1* | 8/2013 | Xiques | H04L 9/083 713/168 |
| 2013/0225081 A1* | 8/2013 | Doss | H04W 4/206 455/41.2 |
| 2013/0305039 A1* | 11/2013 | Gauda | G06F 21/6218 713/153 |
| 2014/0082366 A1* | 3/2014 | Engler | H04L 9/3226 713/176 |
| 2014/0082715 A1* | 3/2014 | Grajek | H04L 63/0815 726/8 |
| 2014/0188616 A1* | 7/2014 | Badenhop | G06Q 30/0267 705/14.58 |
| 2014/0189828 A1* | 7/2014 | Baghdasaryan | H04L 63/0861 726/6 |
| 2014/0244456 A1* | 8/2014 | Huang | G06Q 40/123 705/31 |
| 2014/0279558 A1* | 9/2014 | Kadi | G06Q 20/3278 705/71 |

OTHER PUBLICATIONS

"How can I access secure data with getting a password dialog?" Lab Escape, 2006.

International Search Report, mailed on Sep. 16, 2014, from counterpart International Application No. PCT/US2014/034132, filed on Apr. 15, 2014.

International Preliminary Report on Patentability, mailed on Aug. 20, 2015, from counterpart International Application No. PCT/US2014/034132, filed on Apr. 15, 2014.

* cited by examiner

AUTHENTICATION SYSTEM AND METHOD FOR EMBEDDED APPLETS

BACKGROUND OF THE INVENTION

Security systems protect people, property, and reduce crime for homeowners and businesses alike and have become an increasingly cost-effective tool to reduce risk. These systems have multiple components, such as server systems, display devices, and security devices that communicate over a security network. These security devices include monitoring points, video cameras for capturing live video of an area of interest, physical access control devices such as key pads and card readers, and a variety of sensor devices installed within and at entry and exit points for premises.

Since the rise of web-based management technologies, operators of the security systems typically view and manage the security devices and their information using security management applications installed on servers connected to the security network. The applications are accessible from client devices. The client devices are either directly connected to the security network, or in web-based environments, are located in other networks. Typically, the client devices were workstations that met or exceeded the resource requirements of the applications.

Increasingly, operators of security systems are managing their security networks in web-based environments using mobile computing devices such as smart phones, laptops, and tablets. These user devices typically cost less than workstations, and their mobility enables greater access to the security network than workstations. However, mobile devices, as a general rule, have more limited resources such as memory, screen size, and processing power as compared to workstations.

As a result, security operators are extending the functionality of existing applications using applets. These are smaller, feature-specific applications executed by a web browser. Unlike stand-alone applications, which reside on the client user device, applets are downloaded to the user devices over the network.

Java is a registered trademark of Oracle Corporation. Oracle associates the Java trademark with its eponymous computer programming language, and related infrastructure and tools. As a programming language, Java enables application developers to create general-purpose, machine-independent applications. The Java programming language is especially suited for client-server, web based applications.

Developers typically write applets using the Java programming language. As a result, such applets are also typically referred to as "Java applets". Applets also typically utilize fewer resources, such as memory, than stand-alone Java applications.

In web-based environments, applets are used to provide features to web-based applications that cannot be provided by HTML alone. Applets reside on servers within the security network, and are included within HTML pages on the server. Because the applets are referenced within HTML pages, these are also known as embedded applets. Web browsers on the client user devices request the HTML pages that include the applets.

Applets execute in the context of web browsers on client user devices within the memory space of a program known as a Java Virtual Machine ("JVM"). The JVM memory space is separate from that used by the other programs and the operating system on the user devices. Moreover, the JVM provides a separate "sandbox" for each applet that prevents the applet from interacting with client system resources such as the local file system, unless authorized.

Applets do not inherit authentication credentials from the web browser they are running within. Applets that make use of resources on a network, if necessary, must authenticate themselves independently of the web browser and the HTML pages that they are embedded within.

SUMMARY OF THE INVENTION

These web-based environments must be secured typically through authentication. In one approach, in response to requests for access to HTTP resources on the server system for managing the security system, the server system returns an intermediate HTTP response that indicates authentication is required. The web browser ("browser") typically presents a pop-up dialog, which prompts the user to enter user credential information, the user name and password, for accessing the security system. The browser resends the HTTP request, this time including the authentication credentials. This process is also known as HTTP-based authentication.

After the server allows access to the initial HTML page, the web browser downloads the requested HTML page. The web browser reads the contents of the HTML page, and encounters HTML tags that include the locations of applets on the server. The web browser then downloads the applets from the server.

Applets are embedded within HTML pages using tags. Examples include the <applet . . . /applet> and <object . . . /object> tags. The tags include information, such as URLs which the applets utilize to fetch additional content from the server system.

When embedded applets access additional content from the same restricted server, the applets also request user credentials from the user. As the number of applets increase, and the number of different resources on the server system they access increases, the need for users to re-enter their user credentials becomes inefficient, causes delay, and interrupts operator task flow. This is especially problematic in management of security systems, where real-time response to conditions is crucial for alerting personnel and dispatching emergency responders.

One solution is to relax access restrictions on the server, permitting unrestricted access to the content on the server required by the applets. However, this solution requires maintenance, and increases security risk with each exception.

Some web-based management systems address this problem through user credential caching by the web browsers, and cookies stored on the file system of the user devices. Cookies, also known as web browser cookies, are files created on the client device by the server, and are designed to be readable only by the server that created the cookie. Whether by caching the user credentials or storing them in cookies, however, these solutions decrease security. An attacker may be able to gain unauthorized access to the server by obtaining access to the cookies or the cache on the client user device.

URLs also include extensible fields for including additional data. This capability enables creation of a message channel for custom user credential validation associated with access to server system resources between the user devices and the server system.

It is therefore an object of the present invention to access information from security devices via the server system using embedded applets that receive authentication tokens that were provided by the server system and include the authentication tokens in messages to the server system.

Operators using web browsers on user devices request HTML pages that include the applets for accessing information from the security devices. In response, the server system generates the authentication tokens, modifies the content of the requested HTML page, and includes the authentication tokens in tags within the applet tags of the HTML page. The server system then saves the authentication tokens on the server system, and sends the HTML page to the web browsers.

The authentication tokens allow the applet to inherit the user credentials without the applet having to share user credentials with the browser. When the applets send messages to the server system requesting new content, the applets include the received authentication tokens in the URLs that identify the new content in the messages. The server system receives the authentication tokens in the message, and compares them to the saved authentication tokens to validate the user credentials.

This solution eliminates the need for users to re-enter their credentials when applets seek access to new resources on the server system, while avoiding the security pitfalls of current solutions, such as the server-side approach to relaxing access restrictions, and the client-side approaches of browser caching and cookie-based saving of user credentials.

In general, according to one aspect, the invention features a web-accessible security system comprising a server system connected to a security network that receives information from security devices on the security network, and one or more user devices that access the information from the security devices via the server system using embedded applets. The embedded applets receive authentication tokens that were provided by the server system and include the authentication tokens in messages to the server system.

In one example, the user devices access the server system over a network cloud.

In general, according to another aspect, the server system comprises an authentication system for validating users, applets for accessing the information from the server system, HTML pages that embed one or more of the applets, and a content management system that generates dynamic content for the HTML pages. The authentication system includes an authentication database, wherein the authentication system receives user credentials for each user, generates the authentication tokens associated with the user credentials, and stores the authentication tokens in the authentication database.

Preferably, the user devices include web browsers which request HTML pages on the server system that embed one or more of the applets, the applets accessing the information from the security devices. In response to the user devices loading the embedded applets, the embedded applets receive the authentication tokens from the server system, and save the authentication tokens as applet tokens.

According to another aspect, in response to requests by the user devices for HTML pages on the server system that include the embedded applets for accessing the information from the security devices, the server system generates the authentication tokens associated with user credentials for each user, and stores the authentication tokens in the authentication database. The content management system includes the authentication tokens within the HTML pages, and the server system provides the HTML pages to the user devices.

In one implementation, the authentication system generates new authentication tokens, associated with user credentials on the user devices, each time the user devices request HTML pages that include the embedded applets.

In the preferred embodiment, the server system further comprises a communications channel for communicating the authentication tokens in the messages between the server system and the embedded applets. The communications channel comprises a server-side portion that includes the authentication tokens in the messages that the server system sends to the embedded applets and an applet-side portion that includes applet tokens in the messages that the embedded applets send to the server system.

Preferably, the messages from the server-side portion of the communications channel include an applet tag within the HTML pages requested by the user devices, the applet tag including a first Uniform Resource Locator ("URL") that includes the authentication tokens. The messages from the applet-side portion of the communications channel utilize a second URL that includes the applet tokens, the second URL identifying the location of content on the server system requested by the embedded applets.

In implementations, the second URL comprises a URL query string that includes the applet tokens, and the second URL comprises a path that includes the applet tokens. According to another aspect, the server system stores the authentication tokens in the authentication database.

In general, according to another aspect, the authentication system accepts the applet tokens within the messages from the applet-side portion of the communications channel, and compares the applet tokens to the stored authentication tokens to validate the user. To allow only authorized users with access to the security system, the authentication system preferably removes the stored authentication tokens for each user after performing the user validation to prevent reuse of the stored authentication tokens, and removes the stored authentication tokens for each user after a timeout period.

In general, according to another aspect, the invention features a web-accessible system, comprising a server system for serving information, and one or more user devices that access the information from the server system using embedded applets that receive authentication tokens in messages from the server system and include the authentication tokens in messages to the server system.

In general, according to another aspect, the invention features a method for accessing information from security devices in a web-accessible security system including a security network, a server system, and user devices running embedded applets. The method comprises the server system connecting to the security network and receiving information from security devices on the security network, the user devices accessing the information from the security devices via the server system using the embedded applets, and the embedded applets receiving authentication tokens that were provided by the server system and then including the authentication tokens in messages to the server system.

In the case where an applet provides a token that the server system does not accept, such as one that is too old, the server will respond with a HTTP response indicating that HTTP authentication is required. The applet typically responds by prompting the user to supply authentication credentials. This provides a fallback mechanism should authentication via tokens fail.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
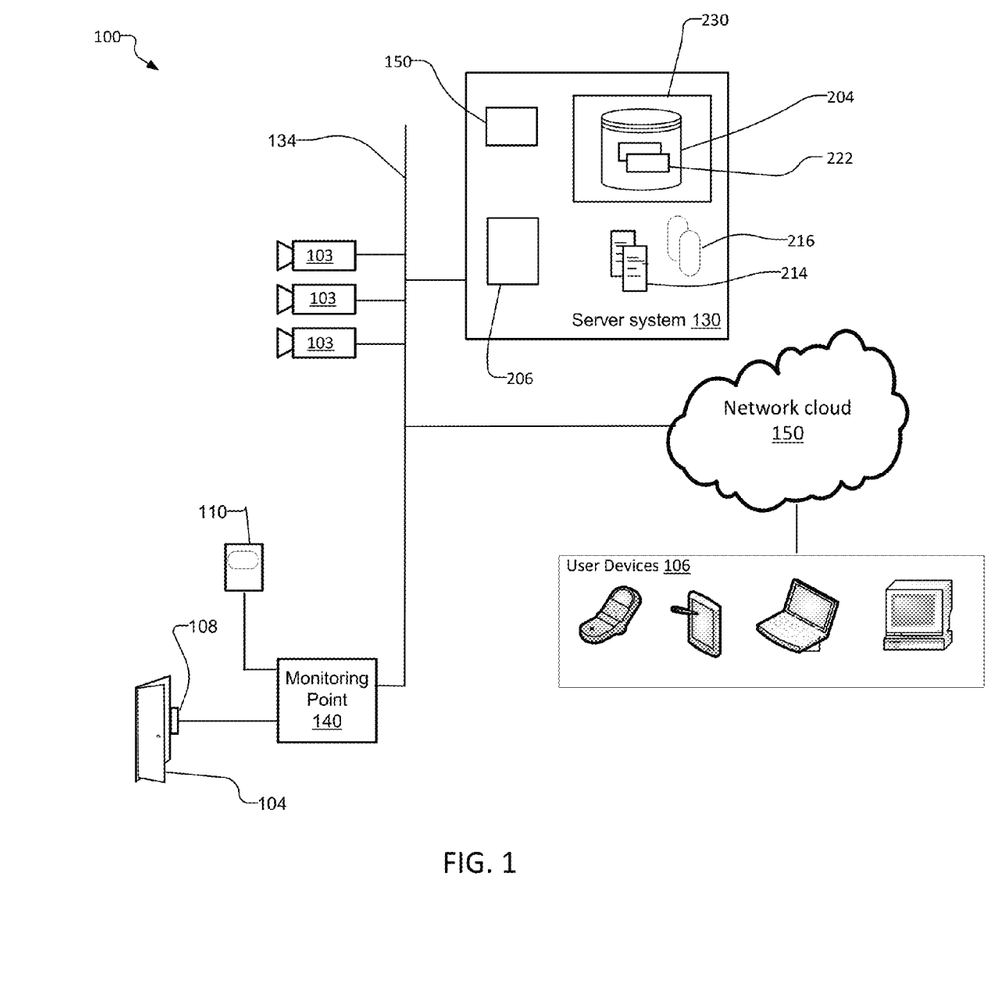
FIG. 1 is a schematic block diagram of an example web-accessible security system that utilizes applets for displaying information from security devices.

FIG. 1 is a schematic diagram of a security system 100, including security devices such as security cameras 103, a door sensor 108 for a door 104, and a motion sensor 110, to list a few examples. Motion sensor 110 and the door sensor 108 connect to a monitoring point 140. The monitoring point 140 and the security cameras 103 connect to a security network 134.

The security system 100 also includes a server system 130. The server system 130 includes an authentication system 230, an analytics system 150, a content management system 206, along with content expressed in HTML pages 214 and applets 216.

The authentication system 230 includes an authentication database 204, which in turn stores authentication tokens 222 generated by the content management system 206.

User devices 106, such as mobile phones, laptops, tablets, and workstations connect to a network cloud 150. The network cloud 150, in turn, connects to the security network 134.

Figure 2:
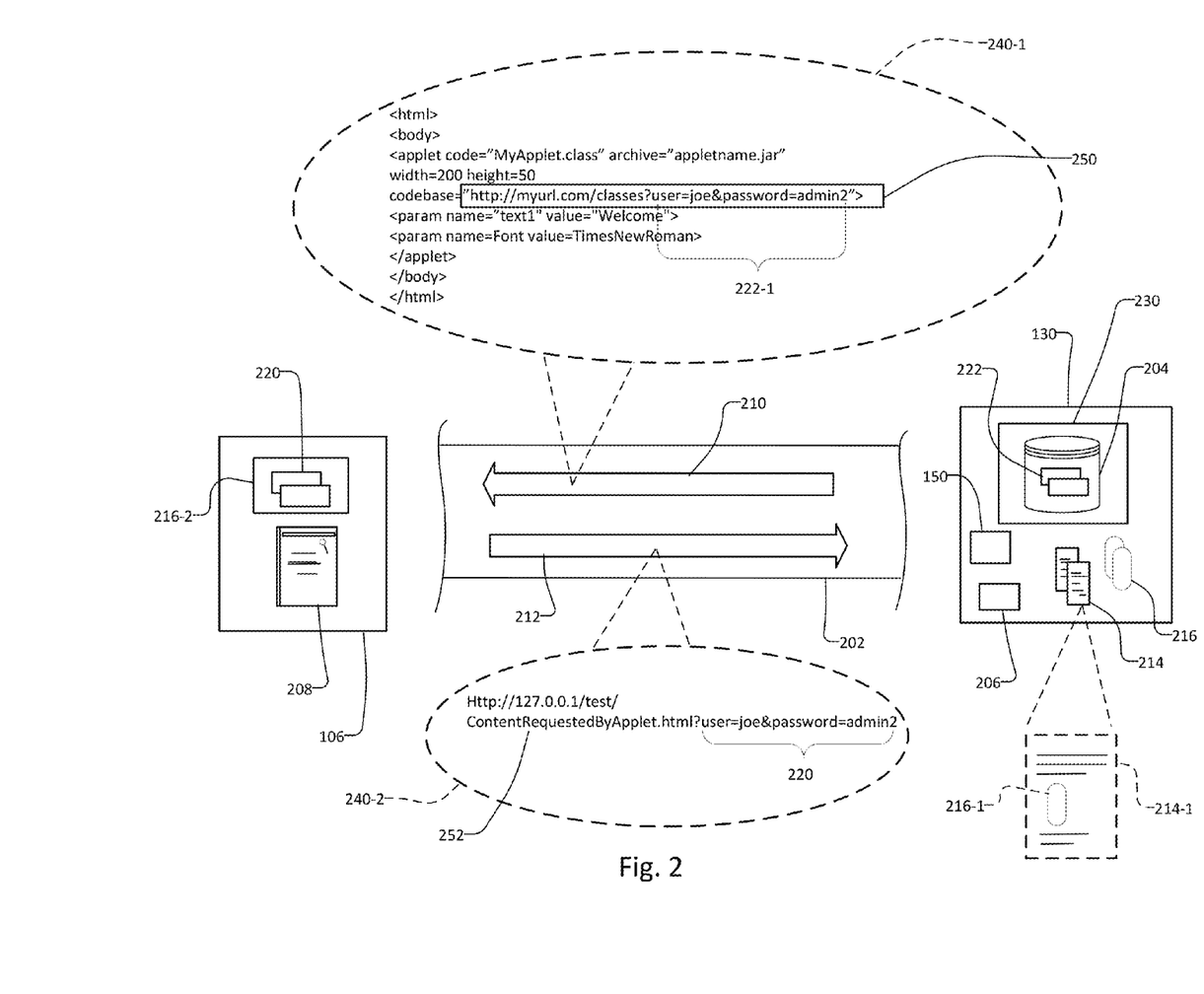
FIG. 2 is a schematic diagram displaying details associated with communicating authentication tokens associated with user credentials between the user devices and the server system, according to the preferred embodiment of the invention.

FIG. 2 is a schematic diagram displaying details associated with communications between the user devices 106 and the server system 130.

The server system 130 utilizes HTTP authentication when users on the user devices 106 initially connect to the server system 130. Then, after the initial HTTP-based authentication of the users, the users request HTML pages 214 from the server system 130 for access to information from the security devices. Users make the requests from browsers 208 on the user devices 106.

Many of the HTML pages 214 include embedded applets 216. Preferably, the authentication system 230 requires user credentials for access to HTML pages 214 that do not include embedded applets. HTML pages 214-1 that include embedded applets 216-1 also require authentication. Embedded applets 216-1 request additional content from the server system 130.

When the server system 130 receives a request from a browser 208 for an HTML page 214-1 that includes an embedded applet 216-1, the content management system 206 dynamically generates authentication tokens 222 associated with the user credentials of the user. The authentication system 230 stores the authentication tokens 222 for the user in the authentication database 204.

The content management system 206 then modifies the content of the requested HTML page 214-1, and includes the generated authentication tokens 222 within tags of the "<applet . . . /applet>" or "<object . . . /object>" tags of the HTML page 214-1.

In one example, the URL that identifies the location of the embedded applet 216-1, referred to as the first URL 250 in FIG. 2, includes the authentication tokens 222-1 within the first URL 250. The first URL 250 is included within tags of the "<applet . . . /applet>" tag. The modified HTML page 214-1 that includes the generated authentication tokens 222-1 forms the contents of a message 240-1 that the server system 130 sends over a two-way virtual communications channel 202 to the user devices 106.

The communications channel 202 includes a server side portion 210, and an applet side portion 212. The downstream, or server-side portion 210, includes the message 240-1 sent by the server system 130 to the browser 208 running on the user devices 106.

The content management system 206 includes the authentication tokens 222 in the part of the first URL 250 that the content management system 206 knows the applet 216 is capable of sending back to the server system 130. The applets 216 are not modified to accept the authentication tokens 222. Rather, the applets 216 are unknowing carriers of the authentication tokens 222.

Some applets, for example, preserve the URL query string, such as Adobe QuickTime applets. QuickTime is a registered trademark of Apple Corporation. QuickTime is associated with audio and video codec software. Adobe is a registered trademark of Adobe Corporation. As a result, for these applets 216, the content management system 206 includes the authentication tokens 222-1 within the URL query string portion of the first URL 250.

Other applets, however, cannot access the URL query string. Java applets, for example, ignore the URL query string altogether. As a result, for Java applets, the content management system 206 includes the authentication tokens 222-1 within the path portion of the first URL 250.

The browser 208 reads the contents of the HTML page 214-1 in the message 240-1, and downloads the embedded applet 216-1 from the server system 130, now referred to as applet 216-2. This is because the applet 216-2 has downloaded to the file system of the user device 106. The browser invokes the applet 216-2, passing the authentication tokens 222-1 in the message 240-1 during initialization of the applet 216-2. The applet 216-2 executes, and saves the authentication tokens 222-1 as applet tokens 220 in the run-time memory of the applet 216-2.

The authentication system 230 generates the authentication tokens 222 each time users access the HTML pages 214-1 that include the embedded applets 216-1. The authentication system 230 provides a limit on reuse of the authentication tokens 222.

When the applets 216-2 send messages 240-2 to the server system 130 requesting new content on the server system 130, the applets 216-2 include the applet tokens 220 in the URLs that identify the new content in the messages 240-2. The authentication system 230 of the server system 130 receives the applet tokens 220 in the message 240-2, and compares them to the saved authentication tokens 222 to validate the user credentials.

The upstream, or applet-side portion 212 of the communications channel 202 includes the message 240-2 sent by the applets 216-2 on the user devices 106 for requesting new content on the server system 130. The URLs that identify the new content in the messages 240-2, referred to as the second URL 252 in FIG. 2, include the applet tokens 220 within the second URL 252. In one example, the second URL 252 includes the applet tokens 220 within the URL query string, which consists of one or more key/value pairs.

In another implementation, the content management system 206 overloads the URL path for the second URL 252 to include the applet tokens 220. However, because URL paths convey location information in a standard format that server systems 130 search to locate the content, overloading the URL path could cause the server system to misinterpret the format or content of the URL path. To avoid this potential problem, the server system 130 must be modified to extract the applet token 220 information from the overloaded URL path before processing the URL path to locate the requested content.

When the authentication system 230 receives the message 240-2 in the applet-side portion, the authentication system 230 extracts the applet tokens 220, and compares them to the saved authentication tokens 222 in the authentication database 204. If the credentials match, the applet 216-2 is granted access to the requested resource, saving the user from re-entering the user credentials.

In yet another example, the server system 130 is enhanced to support both authentication tokens 222 and HTTP-based authentication of applets 216. In cases where the authentication system 230 fails to locate the authentication tokens 222 in the authentication database 204, the server system 130 utilizes HTTP-based authentication, invoking a standard authentication popup dialog on the web browser 208.

The authentication system 230 removes the authentication tokens 220 for a specific user from its authentication database 204 after performing the user credential validation of applet tokens 220 in the messages 240-2 from the applet-side portion 212 of the communications channel 202. This prevents reuse of the authentication tokens 222, and therefore unauthorized access to the server system 130.

The server system 230 supports a time limit associated with authentication tokens 220, and removes the authentication tokens 220 from the authentication database 204 upon expiration of the time limit. This is to enforce the security policy that the applets 216-2 are expected to use the authentication tokens 222-1 as soon as the applets 216-2 are invoked by the browser 208.

The server system 130 supports requests for one or more resources on the server system 230 from an applet 216-2. The authentication system 230 generates the authentication tokens 222 associated with each resource, and includes the authentication tokens 222-1 associated with each requested resource in the first URL 250 that identifies the applet 216-1.

After the applet 216-2 initializes and executes, the applets 216-2 interact with other applications that run within the web browser 208. In one example, the applets 216-2 interact with JavaScript applications running within the web browser 208, which in turn issue AJAX requests for access to new resources on the server system 130. This permits an applet 216-2 to access secure content from the server system 130 beyond that used during the initial loading of the applet 216-2.

Figure 3:
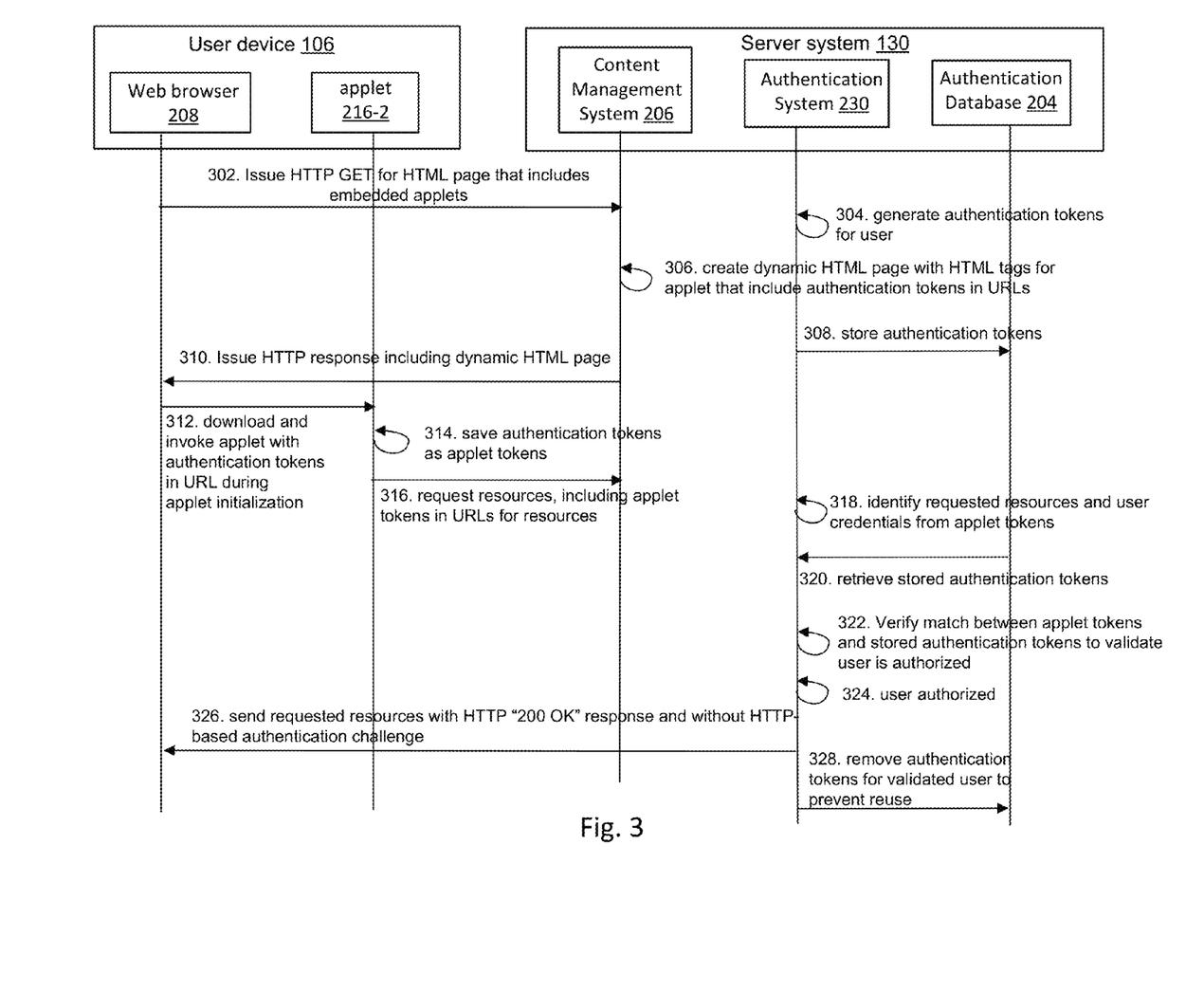
FIG. 3 is a sequence diagram illustrating the sequence of operations between the user devices and components of the server system for validating user access using authentication tokens associated with user credentials.

FIG. 3 a sequence diagram illustrating the sequence of operations between the user devices and components of the server system for validating user access using authentication tokens associated with user credentials. In step 302, the user on user device 106 utilizes web browser 208 to issue an HTTP GET request to the content management system 206, for the HTML page that includes embedded applets. In step 304, the authentication system 230 generates authentication tokens for the user. In response, the content management system 206 creates a dynamic HTML page, with HTML tags for the applet that include the authentication tokens in URLs, in step 306.

In step 308, the authentication system 230 stores the authentication tokens to the authentication database 204. In step 310, the content management system 206 issues an HTTP response to the web browser 208, including the dynamic HTML page. The dynamic HTML page includes the URL for the applet, the URL also including the authentication tokens. Then, according to step 312, the web browser downloads and invokes the applet, including the authentication tokens in the URL during applet initialization.

In step 314, the running applet 216-2 saves the authentication tokens passed in during applet initialization as applet tokens. The applet 216-2 then requests resources from the content management system 206 in step 316. The applet 216-2 includes the applet tokens within the URLs for the requested resources. In step 318, the authentication system 230 identifies the requested resources and the user credentials from the applet tokens.

According to step 320, the authentication system 230 retrieves the stored authentication tokens from the authentication database 204, and verifies a match between the applet tokens and the stored authentication tokens to validate that the user is authorized in step 322. Upon determining that the user is authorized in step 324, the authentication system 320 sends the requested resources to the web browser 208, in step 326. The response indicates HTTP "200 OK" status, without the use of HTTP-based authentication. Finally, in step 328, the authentication system 230 removes the authentication tokens for the validated user from the authentication database 204 to prevent reuse of the stored authentication tokens, therefore preventing unauthorized access to the server system 130.

Figure 4:
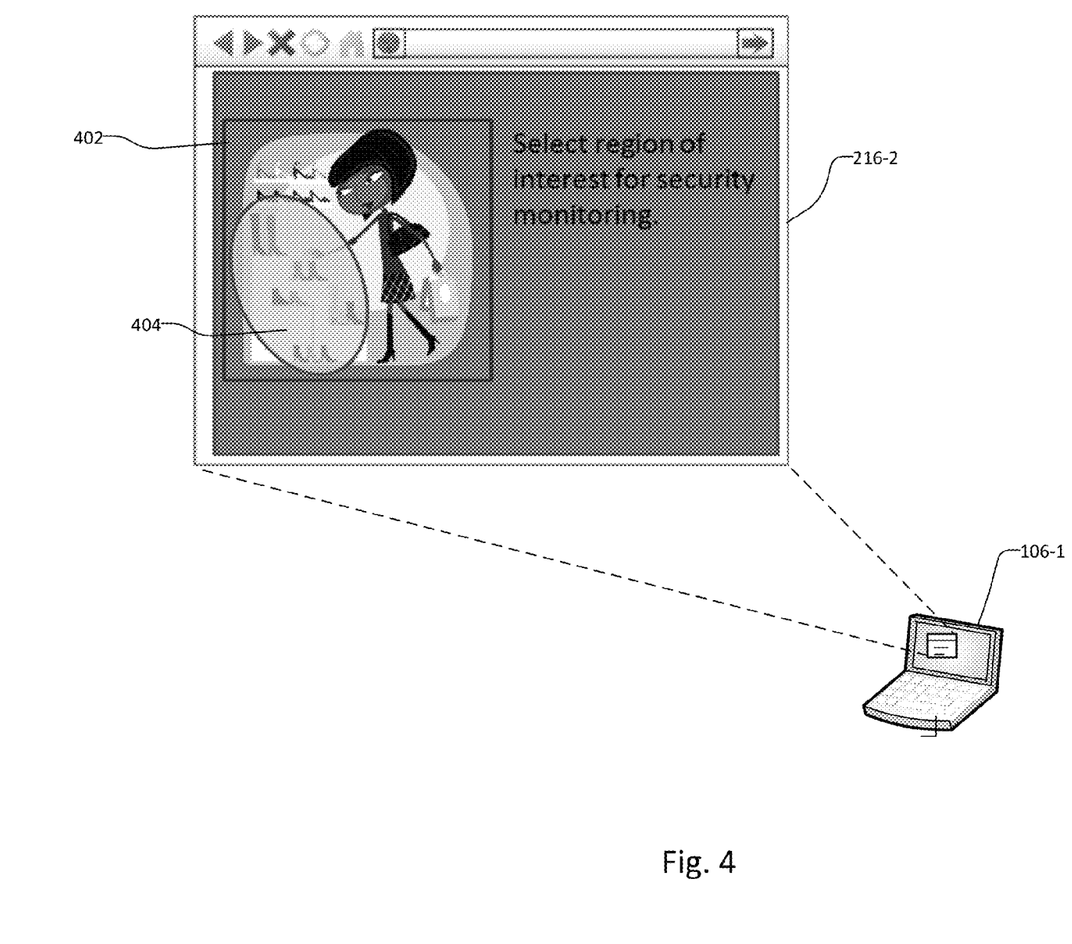
FIG. 4 shows an exemplary applet executing on a user device 106-1 for management and display of information associated with the security devices.

FIG. 4 shows an exemplary applet 216-2 executing on a user device 106-1 for management and display of information associated with the security devices. In the example, applet 216-2 allows the user to view a video image 402 generated by a video camera 103 of a monitored scene, and draw a region of interest 404 on top of the video image 402. The analytics system 150 of the security system 100 monitors the region of interest 404 in response, and alerts the user to events that occur within the region of interest 404 based on security policies.

While this invention has been particularly shown and described with references to preferred embodiments thereof, it will be understood by those skilled in the art that various changes in form and details may be made therein without departing from the scope of the invention encompassed by the appended claims.

What is claimed is:
1. A web-accessible security system, comprising:
  a server system connected to a security network that receives information, which includes video images, from security devices on the security network, wherein the video images are generated by video camera security devices, and wherein the server system generates authentication tokens associated with user credentials for each user, and stores the authentication tokens in an authentication database; and one or more user devices that access the information including the video images from the security devices via the server system using embedded applets that receive the authentication tokens that were provided by the server system, save the authentication tokens as applet tokens, include the applet tokens in Universal Resource Locators (URLs) that identify the video images on the server system, and then include the URLs in messages to the server system; and wherein in response to the server system receiving the messages sent from the embedded applets which include the URLs that identify the video images on the server system and that include the applet tokens, the server system finds a match between the a let tokens in the URLs and the authentication tokens to identify the users as trusted users and responds to the embedded applets with the video images.

2. The system of claim 1, wherein the user devices access the server system over a network cloud.

3. The system of claim 1, wherein the server system further comprises:

an authentication system for validating users that includes an authentication database, wherein the authentication system receives user credentials for each user, generates the authentication tokens associated with the user credentials, and stores the authentication tokens in the authentication database;

HTML pages that include the embedded applets, the embedded applets accessing the information including the video images from the security devices; and a content management system that generates dynamic content for the HTML pages.

4. The system of claim 1, wherein the user devices include web browsers which request HTML pages on the server system, the HTML pages including the embedded applets, the embedded applets accessing the information including the video images from the security devices.

5. The system of claim 4, wherein the web browsers download the embedded applets, and, in response, the embedded applets receive the authentication tokens from the server system, and save the authentication tokens as applet tokens.

6. The system of claim 1, wherein the server system further comprises a content management system and an authentication system, and wherein the authentication system includes an authentication database, and in response to requests by the user devices for HTML pages on the server system that include the embedded applets for accessing the information including the video images from the security devices:

the server system generates the authentication tokens associated with user credentials for each user, and stores the authentication tokens in the authentication database;

the content management system includes the authentication tokens within the HTML pages; and the server system provides the HTML pages to the user devices.

7. The system of claim 6, wherein the authentication system generates new authentication tokens, associated with user credentials on the user devices, each time the user devices request the HTML pages that include the embedded applets.

8. The system of claim 5, further comprising a communications channel for communicating the authentication tokens, wherein the communications channel comprises:

a server-side portion that includes the authentication tokens in messages that the server system sends to the web browsers; and an applet-side portion that includes the applet tokens in the messages that the embedded applets send to the server system.

9. The system of claim 8, wherein the messages from the server-side portion of the communications channel include an applet tag within the HTML pages requested by the user devices, the applet tag including a first Uniform Resource Locator ("URL") that includes the authentication tokens.

10. The system of claim 8, wherein the messages from the applet-side portion of the communications channel include the URLs that include the applet tokens, the URLs identifying a location of content on the server system requested by the embedded applets.

11. The system of claim 10, wherein each of the URLs comprises a URL query string that includes the applet tokens.

12. The system of claim 10, wherein each of the URLs comprises a path that includes the applet tokens.

13. The system of claim 8, wherein the server system further comprises an authentication system that includes an authentication database, and wherein the server system stores the authentication tokens in the authentication database.

14. The system of claim 13, wherein the authentication system accepts the applet tokens within the messages from the applet-side portion of the communications channel, and compares the applet tokens to the stored authentication tokens to validate the user.

15. The system of claim 14, wherein the authentication system removes the stored authentication tokens for each user after performing the user validation to prevent reuse of the stored authentication tokens.

16. The system of claim 13, wherein the authentication system removes the stored authentication tokens for each user after a timeout period.

17. The system of claim 13, wherein the authentication system ignores the stored authentication tokens for each user after a timeout period.

18. The system of claim 1, wherein the embedded applets execute within a web browser running on the user devices.

19. The system of claim 1, wherein the embedded applets enable the users to outline areas defining regions of interest upon the video images generated by the video camera security devices, and wherein the embedded applets display the video images including the regions of interest on the users devices and indicate the regions of interest within the video images.

20. The system of claim 19, wherein an analytics system of the server system monitors the regions of interest indicated within the video images and generates alerts for the users to events that occur within the regions of interest.

21. A method for accessing information, which includes video images, from security devices in a web-accessible security system including a security network, a server system, and user devices running embedded applets, wherein the video images are generated by video camera security devices, the method comprising:

the server system connecting to the security network and receiving the information including the video images from security devices on the security network;

the server system generating authentication tokens associated with user credentials for each user;

storing the authentication tokens in an authentication database;

the user devices accessing the information including the video images from the security devices via the server system using the embedded applets; and the embedded applets receiving the authentication tokens that were provided by the server system, saving the authentication tokens as applet tokens, including the applet tokens in URLs that identify the video images on the server system, and then including the URLs in messages to the server system; and in response to the server system receiving the messages sent from the embedded applets which include the URLs that identify the video images on the server system and that include the applet tokens, the server system finding a match between the applet tokens in the URLs and the authentication tokens to identify the users as trusted users and responding to the embedded applets with the video images.

22. The method of claim 21, further comprising accessing the server system over a network cloud.

23. The method of claim 21, further including an authentication system for validating users, an authentication database, HTML pages, and a content management system, the method comprising:

the authentication system receiving user credentials for each user, generating the authentication tokens associated with the user credentials, and storing the authentication tokens in the authentication database;

the embedded applets accessing the information including the video images from the security devices;

the HTML pages including the embedded applets; and the content management system generating dynamic content for the HTML pages.

24. The method of claim 21, further including web browsers which request HTML pages on the server system, the HTML pages including the embedded applets, the method comprising the embedded applets accessing the information including the video images from the security devices.

25. The method of claim 24, further comprising the web browsers downloading the embedded applets, and in response, the embedded applets receiving the authentication tokens from the server system, and saving the authentication tokens as applet tokens.

26. The method of claim 21, wherein the server system further comprises a content management system and an authentication system, and wherein the authentication system includes an authentication database, and wherein, in response to the user devices requesting HTML pages on the server system that include the embedded applets for accessing the information including the video images from the security devices:

the server system generating the authentication tokens associated with user credentials for each user, and storing the authentication tokens in the authentication database;

the content management system including the authentication tokens within the HTML pages; and the server system providing the HTML pages to the user devices.

27. The method of claim 26, further comprising the authentication system generating new authentication tokens, associated with user credentials on the user devices, each time the user devices request HTML pages that include the embedded applets.

28. The method of claim 24, further including a communications channel for communicating the authentication tokens, the communications channel including a server-side portion and an applet-side portion, the method comprising:

the server-side portion including the authentication tokens in messages that the server system sends to the web browsers; and the applet-side portion including applet tokens in the messages that the embedded applets send to the server system.

29. The method of claim 27, further including an applet tag within the HTML pages requested by the user devices, the applet tag including a first Uniform Resource Locator ("URL"), the method comprising the first Uniform Resource Locator ("URL") including the authentication tokens.

30. The method of claim 28, further comprising the messages from the applet-side portion of the communications channel including the URLs that include the applet tokens, the method comprising the URLs identifying a location of content on the server system requested by the embedded applets.

31. The method of claim 30, further including a URL query string within the URLs, the method comprising including the applet tokens in the URL query string.

32. The method of claim 30, further including a path within the URLs, the method comprising including the applet tokens in the path.

33. The method of claim 28, further comprising storing the authentication tokens in the authentication database.

34. The method of claim 33, further comprising the authentication system accepting the applet tokens within the messages from the applet-side portion of the communications channel, and comparing the applet tokens to the stored authentication tokens to validate the user.

35. The method of claim 34, further comprising the authentication system removing the stored authentication tokens for each user after performing the user validation to prevent reuse of the stored authentication tokens.

36. The method of claim 21, further comprising the embedded applets executing within a web browser running on the user devices.

37. A web-accessible security system, comprising:

a server system connected to a security network that receives information, which includes video images, from security devices on the security network, wherein the video images are generated by video camera security devices, and wherein the server system generates authentication tokens associated with user credentials for each user, and stores the authentication tokens in an authentication database; and one or more user devices that access the information including the video images from the security devices via the server system using embedded applets that receive the authentication tokens that were provided by the server system, save the authentication tokens as applet tokens, and include the applet tokens in messages to the server system;

wherein the user devices access the server system over a network cloud, the user devices include web browsers which request HTML pages on the server system, the HTML pages including the embedded applets, the embedded applets accessing the information including the video images from the security devices, the server system sending messages which include an applet tag within the HTML pages requested by the user devices, the applet tag including a first Uniform Resource Locator ("URL") that includes the authentication tokens, and the server system removes the stored authentication tokens for each user after a timeout period.

38. A system for validating user access to information from security devices in a security system, the system comprising:

a server system connected to a security network that receives information, which includes video images, from the security devices on the security network, wherein the video images are generated by video camera security devices, and wherein the server system generates authentication tokens associated with user credentials for each user, and stores the authentication tokens in an authentication database; and one or more user devices of the users including web browsers requesting HTML pages from the server, wherein the HTML pages include embedded applets, wherein the embedded applets are downloaded from the server system and access the information including the video images from the security devices via the server system, and wherein the embedded applets receive the authentication tokens that were provided by the server system, save the authentication tokens as applet tokens on the user devices, and include the applet tokens in messages to the server system when accessing the information including the video images from the security devices, and wherein the server system compares the applet tokens in the received messages to the stored authentication tokens to validate the users.

* * * * *